(12) United States Patent
Wroblewski et al.

(10) Patent No.: US 8,422,618 B2
(45) Date of Patent: Apr. 16, 2013

(54) APPARATUS AND SYSTEM FOR RESTRICTING THE MOVEMENT OF A COMPONENT

(75) Inventors: Norbert B. Wroblewski, Wilmington, NC (US); Michael S. DeFilippis, Wilmington, NC (US); Robin D. Sprague, Wilmington, NC (US)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 676 days.

(21) Appl. No.: 12/633,345

(22) Filed: Dec. 8, 2009

(65) Prior Publication Data
US 2011/0135049 A1 Jun. 9, 2011

(51) Int. Cl.
*G21C 15/25* (2006.01)
*F04B 53/00* (2006.01)
*G21C 15/00* (2006.01)
*F04B 15/00* (2006.01)

(52) U.S. Cl.
USPC ........... 376/372; 376/260; 376/347; 376/361; 376/366; 376/370; 376/402; 376/407; 417/321; 417/360

(58) Field of Classification Search ................ 376/260, 376/347, 361, 366, 370, 372, 461, 277, 302–304, 376/245, 402, 407; 403/292, 294, 408.1; 244/158.1, 173.1, 173.2; 296/1.01, 187.01, 296/190.01, 190.04, 190.07; 180/311, 312; 411/15, 44, 55; 417/321, 360
See application file for complete search history.

(56) References Cited

U.S. PATENT DOCUMENTS

| | | | | |
|---|---|---|---|---|
| 5,291,967 A * | 3/1994 | Aoki | | 180/312 |
| 5,392,322 A * | 2/1995 | Whitling et al. | | 376/260 |
| 5,502,754 A * | 3/1996 | Erbes | | 376/302 |
| 5,521,951 A * | 5/1996 | Charnley et al. | | 376/260 |
| 5,675,619 A * | 10/1997 | Erbes et al. | | 376/302 |
| 5,802,129 A * | 9/1998 | Deaver et al. | | 376/302 |
| 5,803,686 A * | 9/1998 | Erbes et al. | | 411/55 |
| 5,838,751 A * | 11/1998 | Thompson et al. | | 376/260 |
| 5,905,771 A * | 5/1999 | Erbes et al. | | 376/302 |
| 5,978,433 A * | 11/1999 | Erbes et al. | | 376/372 |
| 6,052,425 A * | 4/2000 | Erbes et al. | | 376/260 |
| 6,067,338 A * | 5/2000 | Erbes | | 376/302 |
| 6,320,923 B2 * | 11/2001 | Wivagg et al. | | 379/260 |
| 6,343,107 B1 * | 1/2002 | Erbes et al. | | 376/260 |
| 6,345,927 B1 * | 2/2002 | Pao et al. | | 403/294 |

(Continued)

FOREIGN PATENT DOCUMENTS
EP 2 237 284 A2 10/2010

OTHER PUBLICATIONS

Seserch Report issued in connection with EP Patent Application No. 10193775.3, Mar. 14, 2012.

*Primary Examiner* — Bernarr Gregory
(74) *Attorney, Agent, or Firm* — Ryan Alley Intellectual Property Law

(57) ABSTRACT

An embodiment of the present invention provides an apparatus and system for repairing and/or maintaining a position of a first component in relation to a second component. The first and second components may be located within a reactor pressure vessel of a nuclear powerplant. The apparatus and system may attach at least one bearing plate to a horizontal surface of the first component. The apparatus and system includes structure to apply a pre-load to the first component. This may assist in maintaining the position of the first component relative to the second component.

20 Claims, 9 Drawing Sheets

U.S. PATENT DOCUMENTS

| | | |
|---|---|---|
| 6,394,765 B1 | 5/2002 | Erbes et al. |
| 6,490,331 B2 | 12/2002 | Erbes |
| 6,625,244 B2 * | 9/2003 | Paillaman et al. ............. 376/245 |
| 7,007,896 B2 * | 3/2006 | Telford et al. ............... 244/173.2 |
| 7,021,856 B2 * | 4/2006 | Assler et al. ................ 403/408.1 |
| 7,416,244 B2 * | 8/2008 | Polk et al. ................. 296/190.07 |
| 7,596,200 B2 * | 9/2009 | Jensen .......................... 376/372 |
| 8,194,815 B2 * | 6/2012 | Wroblewski et al. ......... 376/260 |
| 2004/0190671 A1 | 9/2004 | Wivagg |
| 2005/0247754 A1 | 11/2005 | Butler |
| 2009/0279656 A1 | 11/2009 | DeFilippis et al. |

* cited by examiner

APPARATUS AND SYSTEM FOR RESTRICTING THE MOVEMENT OF A COMPONENT

This application is related to commonly-assigned U.S. patent application Ser. No. 12/385,041, filed Mar. 3, 2009.

BACKGROUND OF THE INVENTION

The present invention relates generally to the connections that integrate some components of a nuclear reactor pressure vessel; and more particularly to an apparatus and system for mitigating the gaps between an inlet mixer and corresponding adjust screws.

A Boiling Water Reactor (BWR) is designed to generate steam in a reactor pressure vessel (RPV) by heating the water surrounding uranium-containing tubes of fuel assemblies located in the RPV core regions. The RPV has recirculation loops designed to facilitate the circulation of water in the core regions. The recirculation loops generally include large centrifugal pumps that pump water out of the RPV and return the water to the inlets of jet pump assemblies located in annular regions in the RPV surrounding the core regions. The jet pump assemblies are designed to entrain the surrounding water in the annular regions and then discharge the water in a manner that induces a desired flow pattern in the core region.

The jet pump assemblies are subject to vibrations caused by hydraulic forces due to the flow of water and/or by the rotation of the centrifugal pumps. Thus, in one BWR design, the jet pump assemblies are horizontally supported against vibration with a jet pump restrainer assembly including a bracket using a three-point suspension system. A multi-point system generally includes a wedge movably mounted on a vertically oriented guide rod that is attached to a jet pump assembly and extends through the space between the bracket and the jet pump. The wedge is designed to slide downwardly under the force of gravity into the space between the bracket and the jet pump assembly, urging the jet pump against the adjustment screws.

Traditionally, gaps develop between adjustment screws and the inlet mixer. This gap is commonly filled with an auxiliary wedge. The auxiliary wedge inhabits the gap and serves to reestablish a desired multi-point contact in the bracket. Commonly, this multi-point contact involves two adjustment screws and the main wedge.

There are a few issues with using an auxiliary wedge. Installation typically requires the following: multiple field measurements; multiple independent calculations of final machining dimensions; machining; and inspection of the machined parts. These processes can add several man-hours to an outage. In addition, an auxiliary wedge may not limit the movement of the mixer pipe away from the adjustment screws.

For the foregoing reasons, an operator of a RPV may desire an apparatus for addressing mitigating adjustment screw gaps. The apparatus should limit the movement of the mixer pipe away from the adjustment screws.

SUMMARY OF INVENTION

In accordance with an embodiment of the present invention, an apparatus adapted for limiting movement of a first component integrated with a second component, the apparatus comprising: at least one plate comprising a contact surface configured to engage a first component; wherein the at least one plate comprises a mechanism configured for applying a load to the first component.

In accordance with an alternate embodiment of the present invention, a system adapted for limiting movement of an object integrated within a nuclear power plant, the system comprising: a reactor pressure vessel (RPV); a jet pump assembly within the RPV; a jet pump restrainer assembly comprising: a top bearing plate attached to an upper surface of a jet pump restrainer assembly bracket; a bottom bearing plate attached to a lower surface of the jet pump restrainer assembly bracket, wherein the top and bottom bearing plates comprise contact surfaces that engage portions of the jet pump assembly; a plurality of mounting bolts configured for integrating the top and bottom bearing plates, and securing the top and bottom bearing plates to the jet pump restrainer assembly bracket; and a mechanism configured for applying a load to a portion of the jet pump assembly.

BRIEF DESCRIPTION OF THE DRAWINGS

The features and advantages of embodiments of the present invention will become more apparent with reference to the attached drawings. The accompanying drawings are intended to depict example embodiments and should not be interpreted to limit the intended scope of the claims. The accompanying drawings are not to be considered as drawn to scale unless explicitly noted.

DETAILED DESCRIPTION

Figure 1:
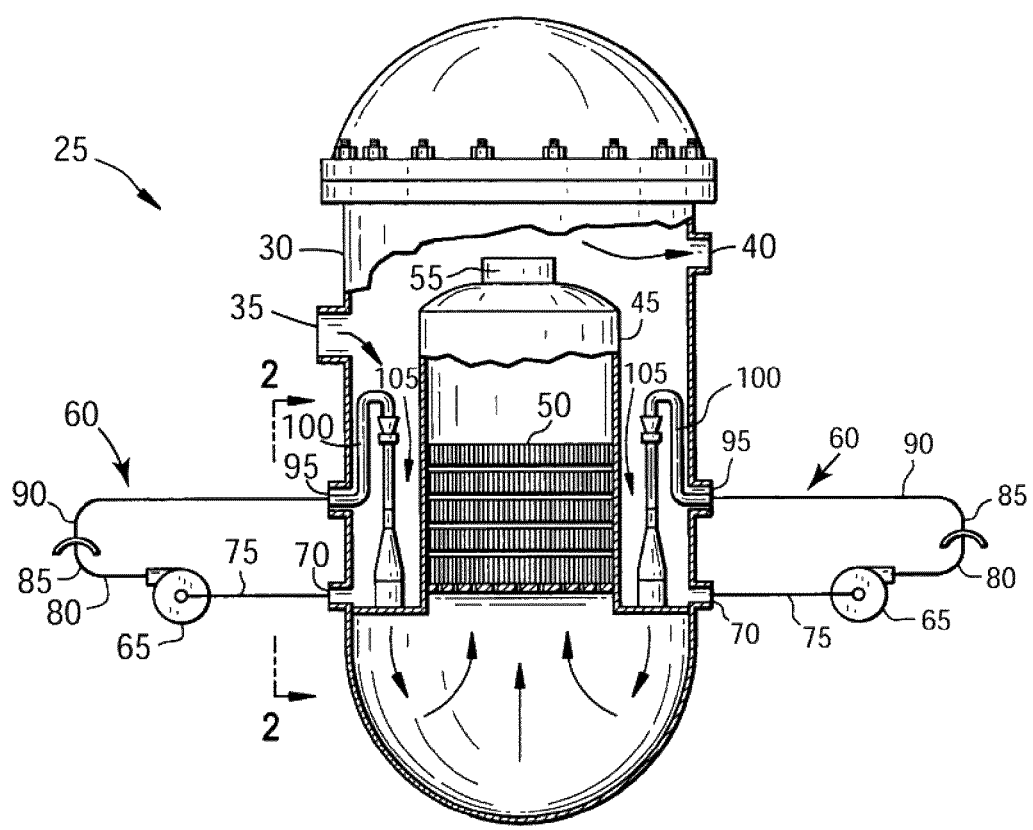
FIG. 1 is schematic illustration of a BWR characterized by a reactor pressure vessel ("RPV") where an embodiment of the present invention operates.

Certain terminology may be used herein for convenience only and is not to be taken as a limitation on the invention. For example, words such as "upper", "lower", "left", "front", "right", "horizontal", "vertical", "upstream", "downstream", "fore", and "aft" merely describe the configuration illustrated in the FIGS. Indeed, the components may be oriented in any direction and the terminology, therefore, should be understood as encompassing such variations unless specified otherwise.

Detailed example embodiments are disclosed herein. However, specific structural and functional details disclosed herein are merely representative for purposes of describing example embodiments. Example embodiments may, however, be embodied in many alternate forms, and should not be construed as limited to only the embodiments set forth herein.

Accordingly, while example embodiments are capable of various modifications and alternative forms, embodiments thereof are illustrated by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any, and all, combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted might occur out of the order noted in the figures/drawings. For example, two successive FIGS. may be executed substantially concurrently or may sometimes be executed in the reverse order, depending upon the functionality/operations involved.

Referring now to the FIGS., where the various numbers represent like parts throughout the several views. FIG. 1 is schematic illustration of a BWR characterized by a reactor pressure vessel ("RPV") having two recirculation loops, within which an embodiment of the present invention operates. FIG. 1 represents a commercial boiling water nuclear reactor ("BWR") 25 that generates steam in a reactor pressure vessel ("RPV") 30. Commercial BWRs 25 are designed to drive turbines (not illustrated), which in turn generates electrical power. The RPV 30 has a main feedwater inlet nozzle 35 for receiving condensate from a condenser (not illustrated) and a main steam outlet nozzle 40 for providing generated steam to a turbine. The RPV 30 supports a core shroud 45 containing a plurality of fuel assemblies 50 that generate the steam in a core region and a steam separator/dryer assembly 55 located over the core shroud 45.

The RPV 30 illustrated in FIG. 1 has two recirculation loops 60 for facilitating the flow of water in its core region. Each recirculation loop 60 has a large centrifugal reactor coolant pump ("RCP") 65 connected with a recirculation water outlet nozzle 70 of the RPV 30 by pump suction piping 75 for pumping water out of the RPV 30 and pump discharge piping 80 for pumping the water back into the RPV 30. The pump discharge piping 80 generally includes a header 85 and parallel branch piping, which is illustrated by piping 90. Each piping branch is connected by a recirculation water inlet nozzle 95 to riser piping 100, which extends to a pair of jet pump assemblies 105 operating in parallel.

Figure 2:
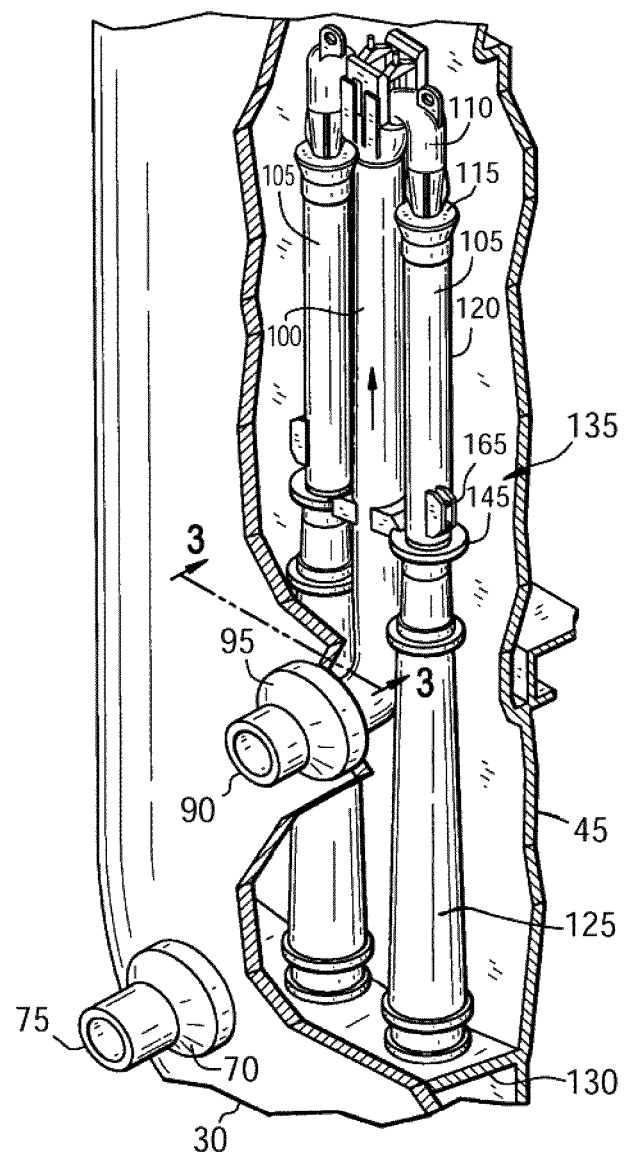
FIG. 2 is a partial perspective schematic illustration of a RPV taken along Line 2-2 of FIG. 1, which depicts a cut-away illustrating an arrangement of a jet pump assembly arrangement.
Figure 3:
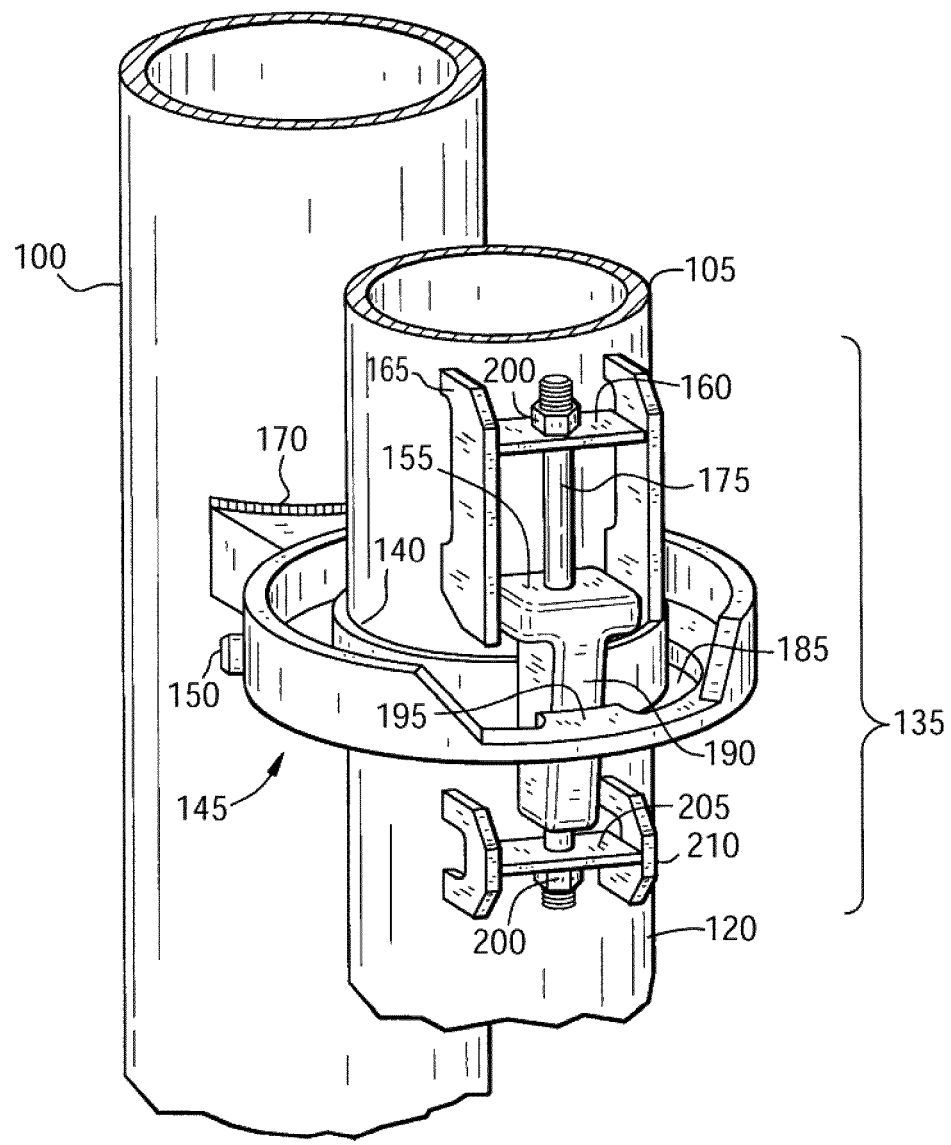
FIG. 3 is a partial perspective elevation view of a jet pump assembly horizontally supported by a jet pump restrainer assembly including a bracket, the view taken along Line 3-3 of FIG. 2.

FIG. 2 is a partial perspective schematic illustration of a RPV 30 taken along Line 2-2 of FIG. 1, which depicts a cut-away illustrating a jet pump assembly 105. The jet pump assembly 105 includes an inlet mixer 120 and a diffuser section 125 supported on plate 130. A jet pump restrainer assembly 135 is used to horizontally restrain the inlet mixer 120 to riser piping 100. As illustrated in FIG. 3, a boss 140 may exist on a periphery surface of the inlet mixer 120.

FIG. 3 is a partial perspective elevation view of an inlet mixer 120 horizontally supported by a jet pump restrainer assembly 135 including a restrainer bracket 145, the view taken along Line 3-3 of FIG. 2. As illustrated in FIG. 3, jet pump restrainer assembly 135 includes: a restrainer bracket 145, adjustment screws 150, and welds 170. The wedge 155 is movably mounted on a vertically extending guide rod 175 fastened to the inlet mixer 120. The guide rod 175 may have a threaded end engaged with guide rod nut 200. An upper portion of the guide rod 175 may be fastened to horizontal plate 160, extending between vertical plates 165; which extend from the inlet mixer 120. A lower portion of the guide rod 175 may be fastened to horizontal plate 210, extending between vertical plates 210; which extend from the inlet mixer 120.

As illustrated in FIG. 3, the upper end of the guide rod 175 is above the restrainer bracket 145 and the lower end of the guide rod 175 is below the restrainer bracket 145. Also, the wedge 155 may move downwardly on the guide rod 175 under the force of gravity to a location where an inner surface of the wedge 155 contacts the boss 140 and an outer surface 190 of the wedge 155 that is inclined contacts an edge 195 of the restrainer bracket 145. The weight of the wedge 155 may provide a sufficient force for urging the inlet mixer 120 against two (or more) adjustment screws 150; which horizontally support the inlet mixer 120 against hydraulic forces and vibrations. The adjustment screws 150 may be fixed in place by welds (not illustrated). Advantageously, this multi-point suspension system can accommodate substantial thermal expansion differences.

As illustrated and correspondingly discussed below in FIGS. 4-9, an embodiment of the present invention provides an apparatus adapted for limiting movement of a first component, such as, but not limiting of, the inlet mixer 120, integrated with a second component, such as, but not limiting of, the restrainer bracket 145. An embodiment of the apparatus may comprise at least one plate having a contact surface configured to engage the first component, wherein the at least one plate comprises a mechanism configured for applying a load to the first component. This load, which may be considered a pre-load, coldspring, or the like, may reduce (or eliminate) the aforementioned gaps between the adjustment screws 150 and the boss 140. An embodiment of the mechanism may comprise at least one loading bolt 325; which applies a pre-load to the first component. In an embodiment of the present invention an area 350 adjacent to side portion 345 (illustrated in FIG. 7) may store energy and function as a spring.

Figure 4:
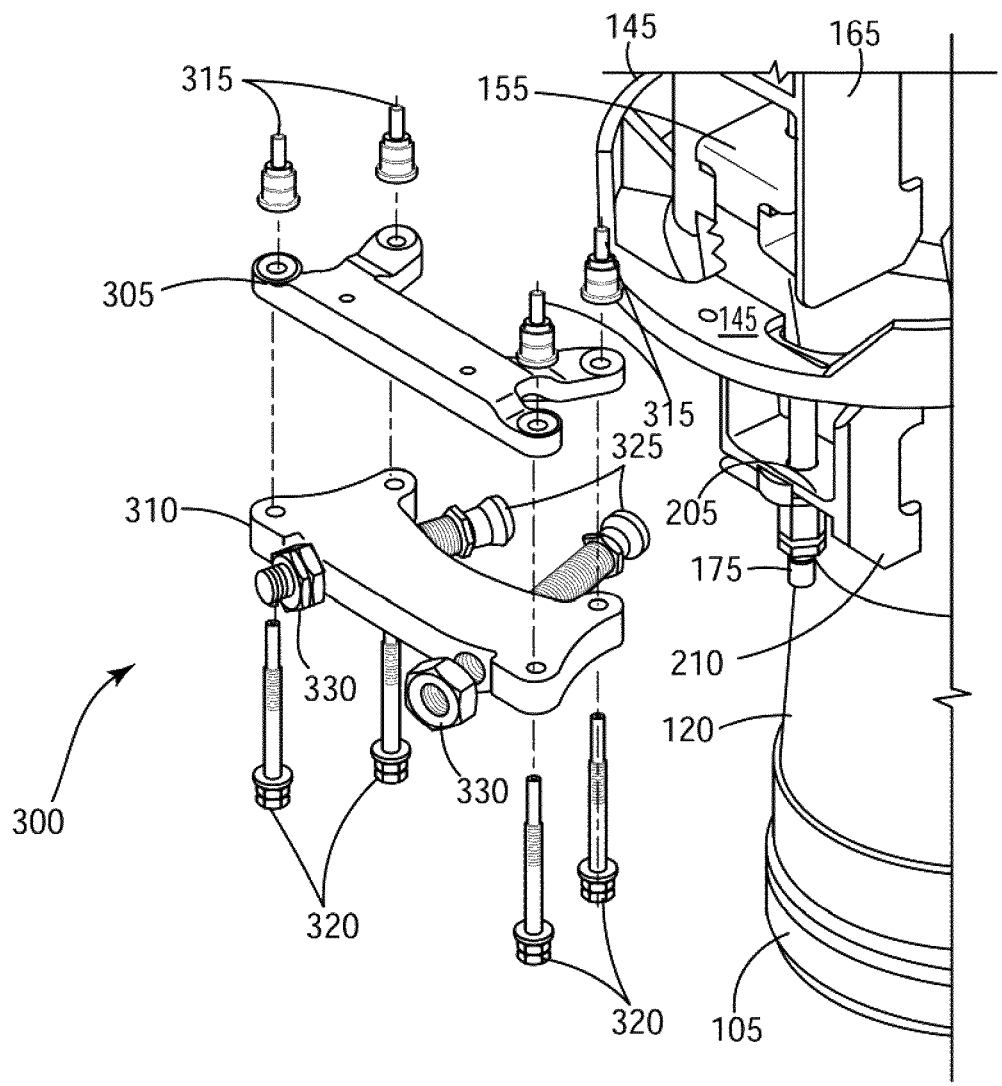
FIG. 4 is a partially exploded view of the jet pump restrainer assembly repair, interfacing with a bracket and mixing wedge, in accordance with a first embodiment of the present invention.

FIG. 4 is a partially exploded view of the jet pump restrainer assembly repair 300, interfacing with a restrainer bracket 145 and a wedge 155, in accordance with a first embodiment of the present invention. The first embodiment of the jet pump restrainer assembly repair 300 may comprise: an upper bearing plate 305 and a lower bearing plate 310, which may adapted for partially enclosing a portion of the restrainer bracket 145. A joining means, such as, but not limiting of, mounting nuts 315 and mounting bolts 320 collectively function to hold plates 305, 310 in place. The mounting nuts 315 and mounting bolts 320 may be located anywhere on the plates 305, 310 that allow for an adequate bearing and a secure connection to the restrainer bracket 145. This first embodiment of the present invention also comprises two loading bolts 325 and corresponding loading nuts 330, as illustrated in FIG. 4. However, embodiments of a jet pump restrainer assembly repair 300 may comprise more or less than two loading bolts 325 and corresponding loading nuts 330. In this first embodiment of the present invention, the two loading bolts 325 may pass through the lower bearing plate 310, as illustrated in FIG. 4. An end of each loading bolt 325 may comprise a shape that securely engages a surface of the inlet mixer 120.

Figure 5:
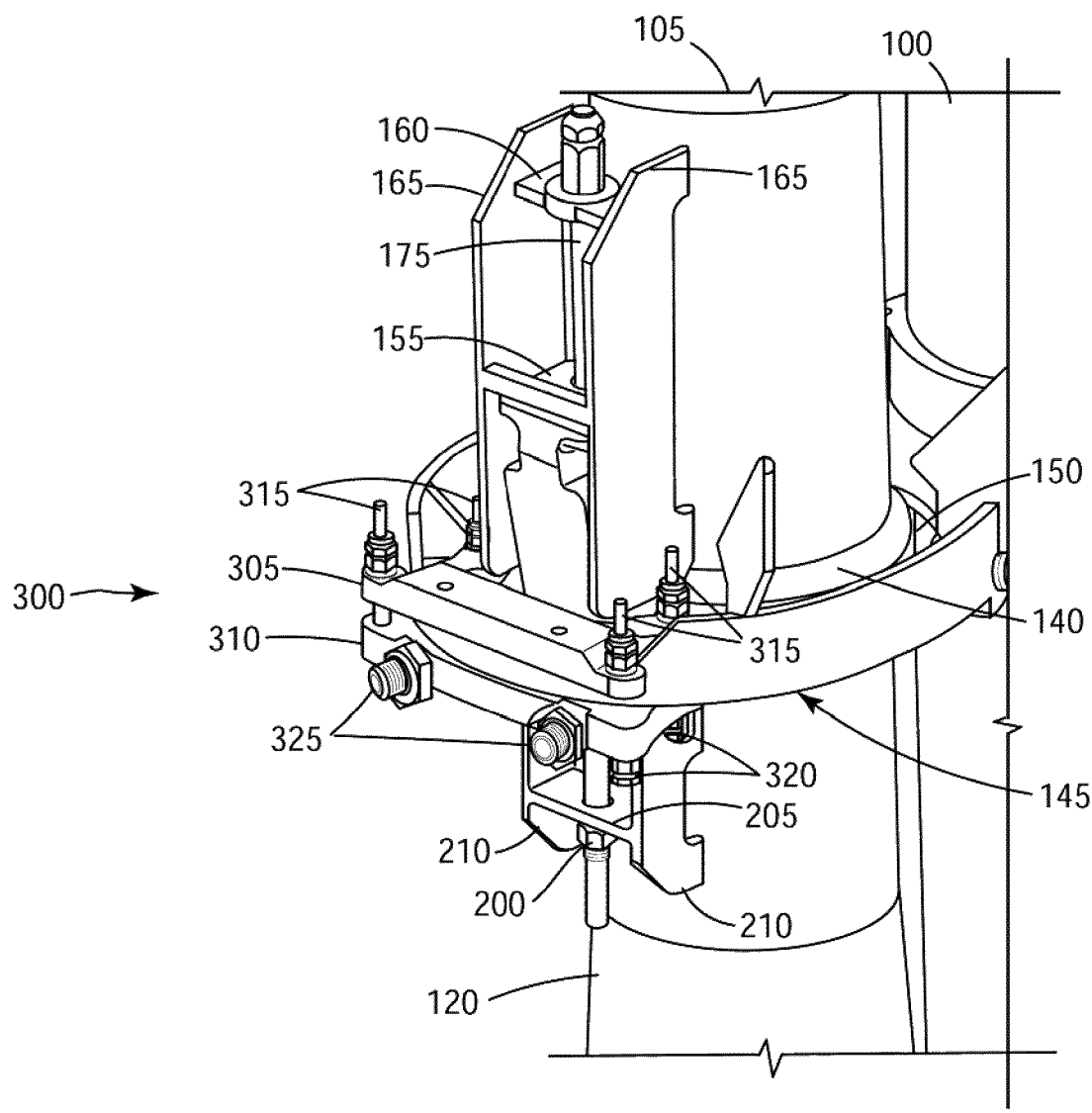
FIG. 5 is a perspective view from a slight overhead angle of the jet pump restrainer assembly repair of FIG. 4 interfacing with a bracket and mixing wedge, in accordance with a first embodiment of the present invention.

FIG. 5 is a perspective view from a slight overhead angle of the jet pump restrainer assembly repair 300 of FIG. 4 interfacing with a restrainer bracket 145 and mixing wedge 155, in accordance with a first embodiment of the present invention. FIG. 5 illustrates the jet pump restrainer assembly repair 300 of FIG. 4 assembled and mounted on the restrainer bracket 145. As discussed, this first embodiment of the present invention provides the two loading bolts 325 passing through the lower bearing plate 310, as illustrated in FIG. 4. This is not intended to be a limitation on the present invention. Other embodiments of the present invention may allow at least one loading bolt 325 to pass solely through the upper bearing plate 305. Moreover, other embodiments of the present invention may allow for at least one loading bolt 325 to pass through the upper bearing plate 305; and at least one loading bolt 325 to pass through the lower bearing plate 310.

Figure 6:
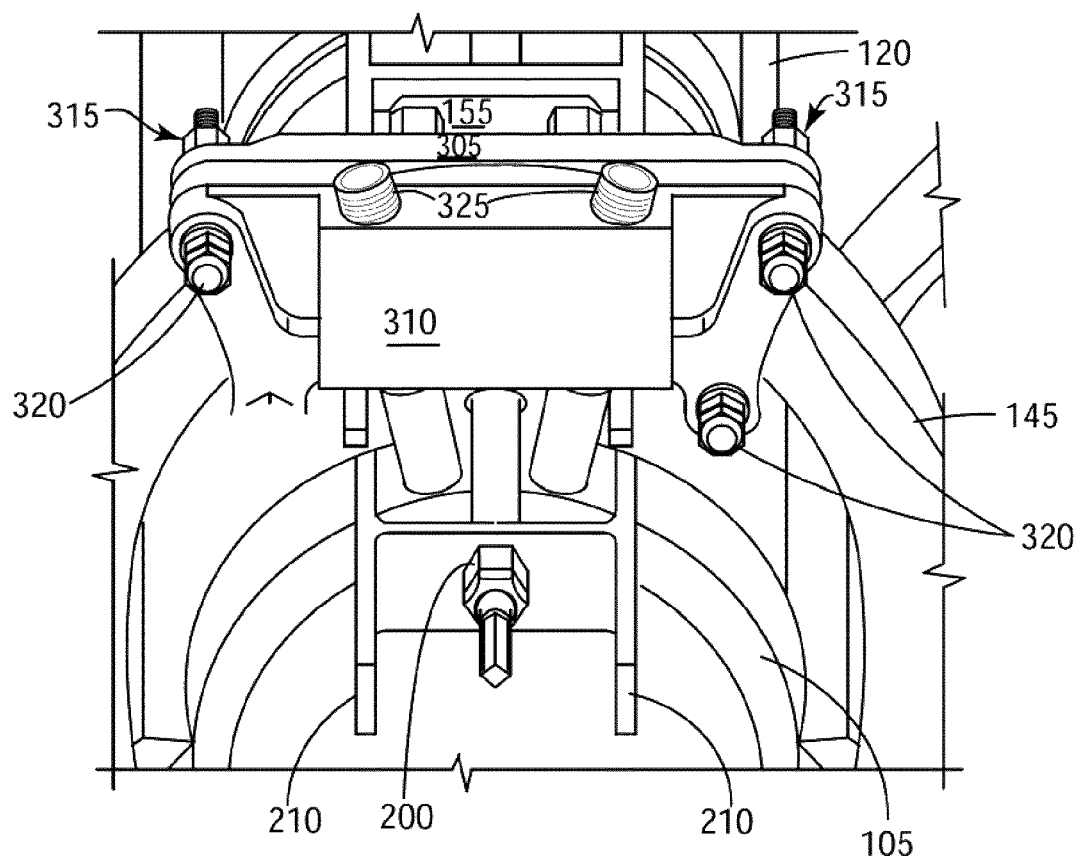
FIG. 6 is a perspective view from a slight underneath angle of an embodiment of the jet pump restrainer assembly repair of FIG. 4 interfacing with a bracket and a mixing wedge, in accordance with a first embodiment of the present invention.

FIG. 6 is a perspective view from a slight underneath angle of an embodiment of the jet pump restrainer assembly repair 300 of FIG. 4 interfacing with a restrainer bracket 145 and a mixing wedge 155, in accordance with a first embodiment of the present invention. FIG. 6 illustrates that an embodiment of the present invention may incorporate loading bolts 325 that may not require the loading nuts 330; which are illustrated in FIGS. 4 and 5. Here, the loading bolts 325 may comprise a countersunk means for applying the torque that directs the pre-load onto either the jet pump assembly 105 or the wedge 155. For example, but not limiting of, an end of the loading bolt 325 may have the form of an alien head, which mates with a corresponding allen wrench.

FIG. 6 also illustrates how an embodiment of the present invention may provide multiple points of contact directly on the inlet mixer 120. This may allow for the removal of the wedge 155.

This first embodiment of the present invention may also allow each loading bolt 325 to independently apply the pre-load to the inlet mixer 120. Here, the torque applied to each loading bolt 325 may be varied; depending in part on, for example, but not limiting of, the physical location and of each loading bolt on the jet pump restrainer assembly repair 300.

Figure 7:
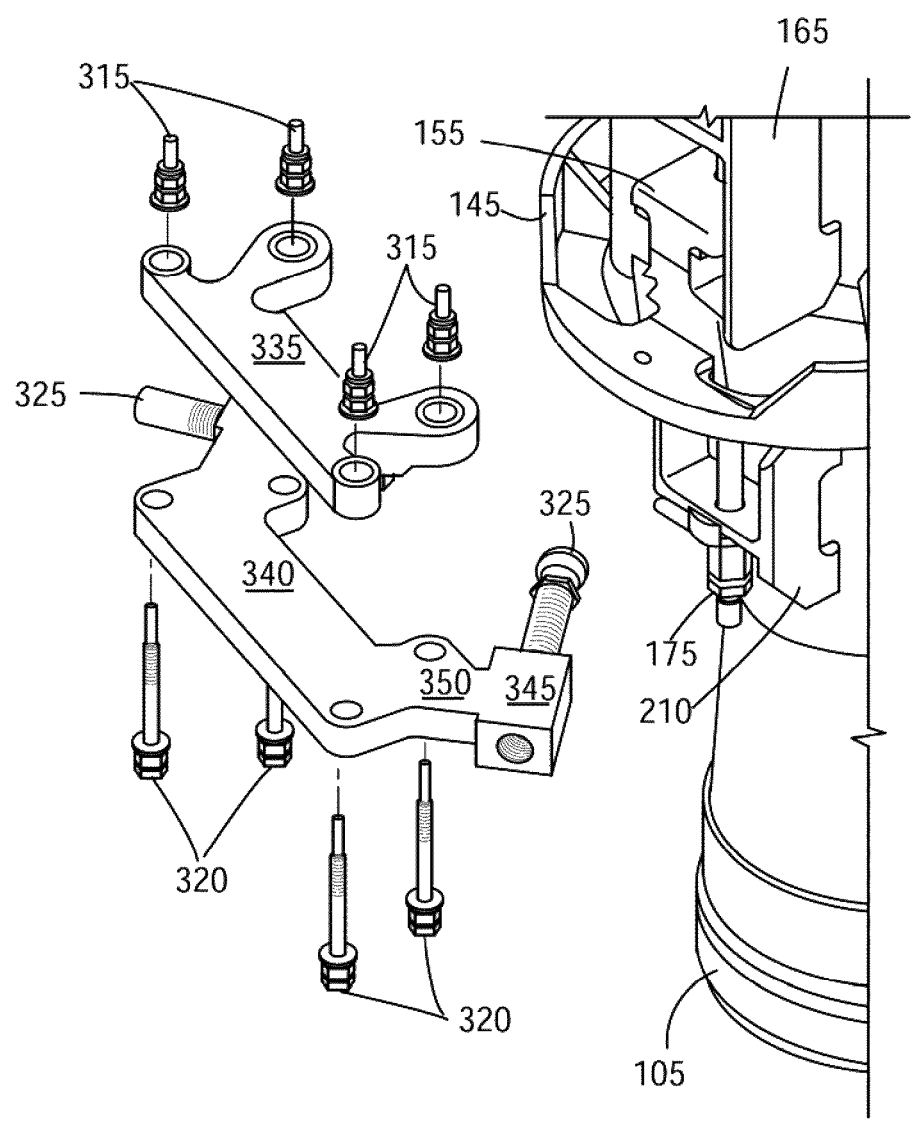
FIG. 7 is a partially exploded view of the jet pump restrainer assembly repair of FIG. 7, interfacing with a bracket, in accordance with an alternate embodiment the present invention.
Figure 8:
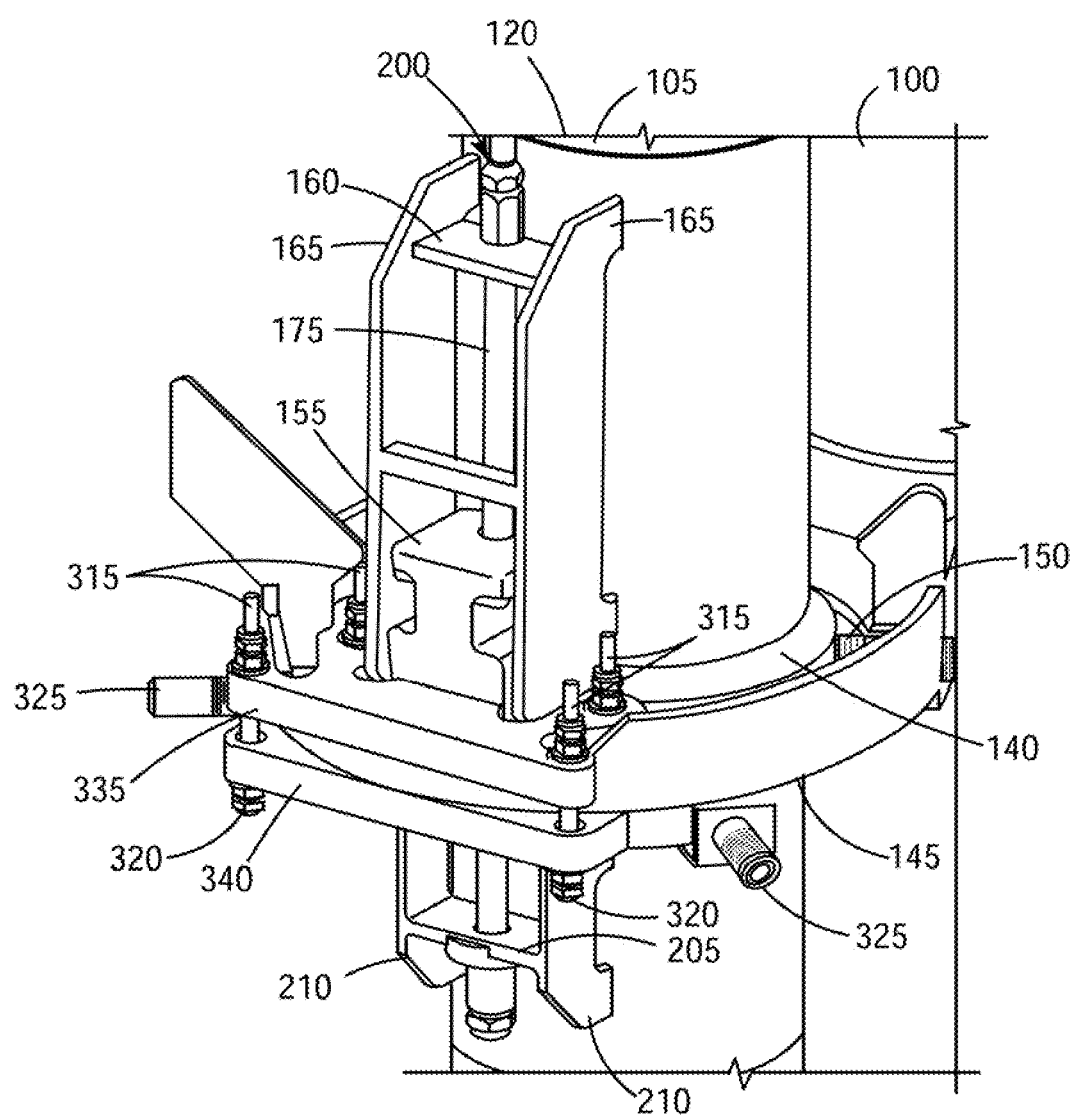
FIG. 8 is a perspective view from a slight overhead angle of an alternate embodiment of the jet pump restrainer assembly repair interfacing with a bracket, in accordance with an alternate embodiment of the present invention.
Figure 9:
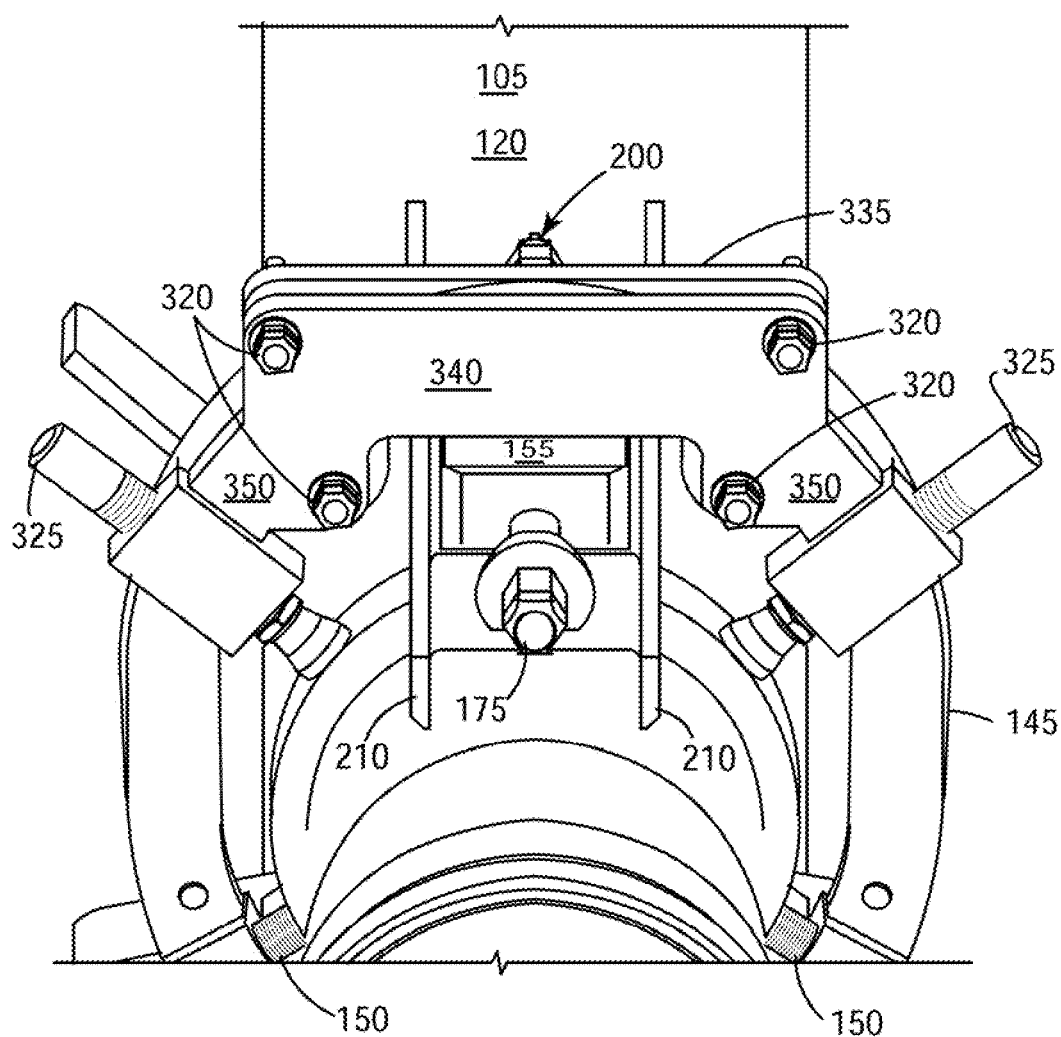
FIG. 9 is a perspective view from a slight underneath angle of an alternate embodiment of the jet pump restrainer assembly repair interfacing with a bracket, in accordance with an alternate embodiment of the present invention.

FIGS. 7 through 9 illustrate a second embodiment of the jet pump restrainer assembly repair 300. As illustrated and described below, a key difference between the first and second embodiments of the present invention is the location of the loading bolts 325. As illustrated in FIGS. 4 through 6, the first embodiment may have the loading bolts 325 located adjacent a central lateral portion of either the upper bearing plate 305 and/or the lower bearing plate 310. However, the loading bolts 325 of the second embodiment (as illustrated in FIGS. 7 through 9) may have the loading bolts 325 located adjacent the side portion 345 of either the top bearing plate 335 and/or the bottom bearing plate 340.

FIG. 7 is a perspective view from a slight overhead angle of a second embodiment of the jet pump restrainer assembly repair 300 interfacing with a restrainer bracket 145, in accordance with the present invention. This second embodiment of the jet pump restrainer assembly repair 300 may comprise: a top bearing plate 335 and a bottom bearing plate 340, which may be adapted for partially enclosing a portion of the restrainer bracket 145. A joining means, such as, but not limiting of, mounting nuts 315 and mounting bolts 320 collectively function to hold plates 335, 340 in place. The mounting nuts 315 and mounting bolts 320 may be located anywhere on the plates 335, 340 that allow for an adequate bearing and a secure connection to the restrainer bracket 145. This second embodiment of the present invention may also comprise two loading bolts 325 and corresponding loading nuts 330, as illustrated in FIGS. 4 and 7. However, embodiments of a jet pump restrainer assembly repair 300 may comprise more or less than two loading bolts 325 and corresponding loading nuts 330. In this second embodiment of the present invention the two loading bolts 325 may pass through the bottom bearing plate 340, as illustrated in FIGS. 4 and 7. An end of each loading bolts 325 may comprise a shape that securely engages a surface of the inlet mixer 120. The loading bolts 325 may pass through side portions 345 (only one is illustrated) of the bottom bearing plate 340. This feature may allow for the jet pump restrainer assembly repair 300 to integrate with the restrainer bracket 145, while the wedge 155 is in a normal/engaged position.

FIG. 8 is a perspective view from a slight overhead angle of the jet pump restrainer assembly repair 300 of FIG. 7 interfacing with a restrainer bracket 145, in accordance with a second embodiment of the present invention. FIG. 8 illustrates the jet pump restrainer assembly repair 300 of FIG. 7 assembled and mounted on the restrainer bracket 145. As discussed, this second embodiment of the present invention provides the two loading bolts 325 passing through the lower bearing plate 340, as illustrated in FIG. 7. This is not intended to be a limitation on the present invention. Other embodiments of the present invention may allow at least one loading bolt 325 to pass solely through the top bearing plate 335. Moreover, other embodiments of the present invention may allow for at least one loading bolt 325 to pass through the top bearing plate 335; and at least one loading bolt 325 to pass through the bottom bearing plate 340.

FIG. 9 is a perspective view from a slight underneath angle of an embodiment of the jet pump restrainer assembly repair 300 of FIG. 7 interfacing with a restrainer bracket 145, in accordance with a first embodiment of the present invention. FIG. 9 illustrates how an embodiment of the present invention may incorporate loading bolts 325 that may not require the loading nuts 330, illustrated in FIGS. 4 and 5. These loading bolts 325 may comprise a countersunk means for applying the torque that directs the pre-load onto either the jet pump assembly 105 or the wedge 155, as previously described.

FIG. 9 also illustrates how an embodiment of the present invention may provide multiple points of contact directly on the inlet mixer 120. Here, for example, but not limiting of, the jet pump restrainer assembly repair 300 provides two additional points of contact directly on the inlet mixer 120. Thus allowing for five points of contact. Two from the jet pump restrainer assembly repair 300, two from the adjustment screws 150, and one from the wedge 155.

This second embodiment of the present invention may also allow each loading bolt 325 to independently apply the pre-load to the inlet mixer 120. Here, the torque applied to each loading bolt 325 may be varied; depending in part on, for example, but not limiting of, the physical location and of each loading bolt 325 on the jet pump restrainer assembly repair 300.

While example embodiments illustrate two bearing plates (one to be positioned above restrainer bracket 145, and the other to be positioned below the restrainer bracket 145), four mounting bolts 320 (two to be located on either side of a restrainer bracket 145), it should be understood that the discussed embodiments are not intended to limit the present invention. Specifically, jet pump restrainer assembly repair 300 may be provided with just one bearing plate (to be positioned either above or below the restrainer bracket 145), a greater or lesser number of mounting bolts 320 to be located in any position that securely attaches bearing plates 305, 310, 335, 340 to the restrainer bracket 145.

Additionally, while an example embodiment may use mounting bolts 320 to hold plates 305, 310, 335, 340 together and affix the jet pump restrainer assembly repair 300 to the restrainer bracket 145, any means may be used to fulfill this purpose. For example, but not limiting of, clamps, welds, screws, nails, adhesive, or other means may be used to attach plates 305, 310, 335, 340 to the restrainer bracket 145. While plates 305, 310, 335, 340 are referred to as plural (specifically, two plates) throughout this document, it should be understood that, alternatively, only one bearing plate might be used instead. Furthermore, while example embodiments show mounting bolts 320 that preferably does not penetrate the restrainer bracket 145, other attachment means, such as, but not limiting of, mounting bolts, clamps, screws, nails, may alternatively penetrate the restrainer bracket 145 as a way of attaching plates 305, 310, 335, 340 to the restrainer bracket 145.

Embodiments of the present invention provide many benefits, some of which have been described. Furthermore, an embodiment of the present invention may be self-contained, and may not require alternation to surrounding fixtures. Furthermore, the present invention may not require field measurement, final machining, extra tooling, and may reduce down time.

Although the present invention has been shown and described in considerable detail with respect to only a few exemplary embodiments thereof, it should be understood by those skilled in the art that we do not intend to limit the invention to the embodiments since various modifications, omissions and additions may be made to the disclosed embodiments without materially departing from the novel teachings and advantages of the invention, particularly in light of the foregoing teachings. Accordingly, we intend to cover all such modifications, omissions, additions and equivalents as may be included within the spirit and scope of the invention as defined by the following claims.

What is claimed is:

1. An apparatus for securing a jet pump assembly within a nuclear reactor pressure vessel, the jet pump assembly including an inlet mixer and a jet pump restrainer assembly bracket surrounding and separated from the inlet mixer, the apparatus comprising:
   at least one plate configured to affix to the jet pump restrainer assembly bracket, wherein the plate includes a mechanism configured to apply an adjustable pre-load to the inlet mixer in a radial direction orthogonal to a surface of the inlet mixer.

2. The apparatus of claim 1, wherein the mechanism includes a plurality of loading bolts.

3. The apparatus of claim 2, wherein the pre-load is configured to limit relative movement of the jet pump restrainer assembly bracket and the inlet mixer.

4. The apparatus of claim 2, wherein the loading bolts are configured to directly engage the inlet mixer.

5. The apparatus of claim 2, wherein the loading bolts are configured to indirectly engage the inlet mixer via a wedge of the jet pump assembly.

6. The apparatus of claim 2, wherein a first bolt of the plurality of bolts is configured to apply an adjustable pre-load independent of an adjustable pre-load of a second bolt of the plurality of bolts.

7. The apparatus of claim 1, wherein the at least one plate is a plurality of plates, and wherein the plurality of plates are configured to affix to the jet pump restrainer assembly bracket by clamping on opposite sides of the jet pump restrainer assembly bracket.

8. The apparatus of claim 7, further comprising:
   a plurality of mounting bolts configured to join and bias the plurality of plates toward one another about the jet pump restrainer assembly bracket so as to provide the clamping.

9. A system for limiting movement of an object integrated within a nuclear power plant, the system comprising:
   a reactor pressure vessel (RPV);
   a jet pump assembly within the RPV, wherein the jet pump assembly includes a jet pump restrainer assembly bracket; and
   a jet pump restrainer assembly including,
      a top bearing plate attached to an upper surface of the jet pump restrainer assembly bracket,
      a bottom bearing plate attached to a lower surface of the jet pump restrainer assembly bracket, wherein the top and bottom bearing plates include contact surfaces that engage portions of the jet pump assembly,
      a plurality of mounting bolts integrating the top and the bottom bearing plates, wherein the mounting bolts secure the top and the bottom bearing plates to the jet pump restrainer assembly bracket, and
      a mechanism applying a load to a portion of the jet pump assembly.

10. The system of claim 9, wherein the mechanism includes at least one loading bolt, and wherein the loading bolt applies a pre-load to an inlet mixer of the jet pump assembly.

11. The system of claim 10, wherein the pre-load limits a movement of the inlet mixer.

12. The system of claim 11, wherein the jet pump assembly further includes a wedge between the inlet mixer and the jet pump restrainer assembly bracket, wherein the wedge assists with positioning the inlet mixer within the jet pump restrainer assembly bracket.

13. The system of claim 12, wherein the at least one loading bolt directly engages the inlet mixer.

14. The system of claim 12, wherein the at least one loading bolt indirectly engages the inlet mixer via the wedge.

15. The system of claim 9, wherein the mechanism is located on at least one of the bottom bearing plate and the top bearing plate.

16. The system of claim of claim 15, wherein the mechanism includes a first loading bolt and a second loading bolt.

17. The system of claim 16, wherein the first and the second loading bolts each applies an independent pre-load an inlet mixer of the jet pump assembly.

18. The system of claim 17, wherein the first and the second loading bolts are located on the bottom bearing plate.

19. The system of claim 18, wherein the first and the second loading bolt are located adjacent a relatively central portion of the bottom bearing plate.

20. The system of claim 18, wherein the first and the second loading bolt are located adjacent end portions of the bottom bearing plate.

* * * * *